(12) United States Patent
Shen et al.

(10) Patent No.: US 10,850,484 B2
(45) Date of Patent: Dec. 1, 2020

(54) MULTILAYER FILMS AND METHODS OF MAKING THE SAME

(71) Applicant: ExxonMobil Chemical Patents Inc., Baytown, TX (US)

(72) Inventors: Zhi-Yi Shen, Shanghai (CN); Zhen-Yu Zhu, Shanghai (CN); Xiao-Chuan Wang, Shanghai (CN); Ying Zou, Shanghai (CN); Xuanyi Tang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/556,343

(22) PCT Filed: Mar. 17, 2015

(86) PCT No.: PCT/CN2015/000182
§ 371 (c)(1),
(2) Date: Sep. 7, 2017

(87) PCT Pub. No.: WO2016/145549
PCT Pub. Date: Sep. 22, 2016

(65) Prior Publication Data
US 2018/0104942 A1   Apr. 19, 2018

(51) Int. Cl.
| | | |
|---|---|---|
| *B32B 27/32* | (2006.01) | |
| *B32B 7/02* | (2019.01) | |
| *B32B 5/02* | (2006.01) | |
| *B32B 33/00* | (2006.01) | |
| B32B 27/12 | (2006.01) | |
| B32B 21/08 | (2006.01) | |
| B32B 15/08 | (2006.01) | |
| B32B 27/36 | (2006.01) | |
| B32B 27/08 | (2006.01) | |
| B32B 27/30 | (2006.01) | |
| B32B 15/20 | (2006.01) | |
| B32B 27/10 | (2006.01) | |
| B32B 27/34 | (2006.01) | |

(52) U.S. Cl.
CPC ............ *B32B 27/327* (2013.01); *B32B 5/022* (2013.01); *B32B 7/02* (2013.01); *B32B 33/00* (2013.01); *B32B 15/08* (2013.01); *B32B 15/20* (2013.01); *B32B 21/08* (2013.01); *B32B 27/08* (2013.01); *B32B 27/10* (2013.01); *B32B 27/12* (2013.01); *B32B 27/304* (2013.01); *B32B 27/306* (2013.01); *B32B 27/32* (2013.01); *B32B 27/34* (2013.01); *B32B 27/36* (2013.01); *B32B 2250/03* (2013.01); *B32B 2250/242* (2013.01); *B32B 2250/40* (2013.01); *B32B 2255/205* (2013.01); *B32B 2262/0253* (2013.01); *B32B 2270/00* (2013.01); *B32B 2307/31* (2013.01); *B32B 2307/406* (2013.01); *B32B 2307/412* (2013.01); *B32B 2307/414* (2013.01); *B32B 2307/514* (2013.01); *B32B 2307/518* (2013.01); *B32B 2307/546* (2013.01); *B32B 2307/558* (2013.01); *B32B 2307/581* (2013.01); *B32B 2307/582* (2013.01); *B32B 2307/72* (2013.01); *B32B 2307/722* (2013.01); *B32B 2307/732* (2013.01); *B32B 2307/736* (2013.01); *B32B 2323/043* (2013.01); *B32B 2323/046* (2013.01); *B32B 2410/00* (2013.01); *B32B 2439/00* (2013.01); *B32B 2439/70* (2013.01); *B32B 2553/00* (2013.01)

(58) Field of Classification Search
CPC ... B32B 27/32; B32B 27/327; B32B 2323/04; B32B 2323/043; B32B 2323/046
See application file for complete search history.

(56) References Cited

U.S. PATENT DOCUMENTS

| | | | |
|---|---|---|---|
| 5,569,693 A | 10/1996 | Doshi et al. | |
| 5,741,563 A | 4/1998 | Mehta et al. | |
| 5,989,725 A * | 11/1999 | Bullard | B32B 27/32 428/516 |
| 6,342,566 B2 | 1/2002 | Burkhardt et al. | |
| 6,368,545 B1 | 4/2002 | Bailey et al. | |
| 6,384,142 B1 | 5/2002 | Burkhardt et al. | |
| 6,956,088 B2 | 10/2005 | Farley et al. | |
| 2012/0100356 A1* | 4/2012 | Ohlsson | B32B 27/20 428/213 |
| 2017/0136746 A1* | 5/2017 | Zhu | B32B 27/32 |

FOREIGN PATENT DOCUMENTS

| | | | | |
|---|---|---|---|---|
| WO | 97/19991 A1 | 6/1997 | | |
| WO | 02/00436 A2 | 1/2002 | | |
| WO | 03/040201 A1 | 5/2003 | | |
| WO | 2006/134155 A1 | 12/2006 | | |
| WO | 2007/140854 A1 | 12/2007 | | |
| WO | 2010/047709 A1 | 4/2010 | | |
| WO | WO-2010047709 A1 * | 4/2010 | ............ | B32B 27/08 |
| WO | 2012/106025 A1 | 8/2012 | | |
| WO | WO 2012/106025 A1 * | 8/2012 | ............ | B32B 27/32 |

OTHER PUBLICATIONS

Wild, L. et al., "Determination of Branching Distributions in Polyethylene and Ethylene Copolymers", Journal of Polymer Science: Polymer Physics Edition, vol. 20, (1982), pp. 441-455.

* cited by examiner

*Primary Examiner* — Rip A Lee
(74) *Attorney, Agent, or Firm* — ExxonMobil Chemical Patents Inc.—Law Department

(57) ABSTRACT

Disclosed are multilayer films which can provide desired film performance suited for packaging applications favoring cost-effectiveness.

20 Claims, No Drawings

MULTILAYER FILMS AND METHODS OF MAKING THE SAME

PRIORITY CLAIM

This application is a National Stage Application of International Application No. PCT/CN2015/000182 filed Mar. 17, 2015, the disclosure of which is fully incorporated herein by its reference.

FIELD OF THE INVENTION

This invention relates to films, and in particular, to multilayer films comprising polyethylene, and methods for making such films.

BACKGROUND OF THE INVENTION

Coextruded blown films and their manufacture are well known in the art. Multilayer films have been developed in which at least one surface or outer layer is made to facilitate heat-sealing and a core layer may be used to provide strength, impact resistance, stretchability, other main physical properties of the film, or combinations thereof.

Polymers used in coextrusion processes for packaging applications generally include polyethylene, polypropylene, ethylene vinyl alcohol, and the like. Film properties are often subject to the combined effect of the coextrusion process conditions and polymer compositions selected for the different layers. Film producers have to balance mechanical properties such as stiffness and impact strength to make stronger films for a given thickness, and optical properties such as clarity and haze which impact the attractiveness of the packaging and visual inspection of the goods at the point of sale.

Favorable optical properties are usually achieved in blown film applications by the inclusion of softer polyolefins, such as very low density polyethylene (LLDPE), usually in combination with other polyethylene polymers, including low density polyethylene (LDPE), linear polyethylene, and high density polyethylene (HDPE), in different layers. Such materials, while offering advantages in clarity, often have negative effects on mechanical properties. Various attempts to optimize this balance continue to restrict the range of stiffness. Likewise, introduction of higher amounts of metallocene polyethylenes (mPEs) into multilayer films with reduced use of LDPE, while providing improved mechanical performance such as stiffness, may lead to undesirable optical properties, such as a higher haze and a lower clarity. Particularly, for certain film applications such as agriculture films and collation shrink films where a mono-coextrusion structure using a uniform composition in all film layers is widely used, the solution by increasing mPE amount in every layer of the film would also result in higher manufacturing cost. Therefore, it is difficult for film manufacturers of such applications to refine the balance between optical and mechanical properties of the film without further increasing mPE consumption under cost pressure.

WO 2012/106025 relates to a multilayer blown film having at least one outer layer comprising a linear polyethylene having a density greater than or equal to 0.921 g/cm$^3$; and a core layer having a metallocene linear polyethylene having a density greater than or equal to 0.927 g/cm$^3$, a melt index ratio between 35 and 60 and a melt index of 0.4 g/10 min or less and a high density polyethylene; wherein the core layer has a density greater than the density of the at least one outer layer.

WO 2010/047709 discloses a high clarity, high throughput film comprising at least two skin layers and at least one core layer there between, wherein the skin layers comprise at least one linear ethylene α-olefin copolymer having an $I_{21}/I_2$ of greater than 20; a density within the range from 0.910 to 0.945 g/cm$^3$ and CDBI of less than 40; and the core layer comprises at least one polyethylene having an overall density of at least 0.910 g/cm$^3$; wherein the film has a dart impact (ASTM D 1709) of greater than 10 g/μm and a Haze (ASTM D 1003 method B) of less than 10%.

WO 2007/140854 provides high clarity multi-layer films where the clarity is improved by reducing the thickness of an LDPE containing core layer beyond its pure draw down limit. More particularly this publication relates to a coextruded multilayer film having (i) a pair of skin layers comprising at least 60 wt % of an LLDPE based on the total weight of polymer in the skin layer; and (ii) at least one core layer comprising from 5 to 100 wt % based on the total weight of polymer in the core layer of an LDPE, which a core layer has a thickness less than the DDL (F0) draw down limit of the LDPE in the core layer.

U.S. Pat. No. 6,368,545 discloses techniques to achieve higher clarity in multilayer blown coextruded films. The core layer may be extruded at a higher temperature than the skin layer or layers, and/or the core layer has a higher density than the skin layer or layers.

As discussed above, numerous efforts have been made to explore a good solution to maximize overall film performance, e.g., differentiation in density or processing conditions for the films, introduction of LDPE in the outer layer and HDPE in the core layer, etc. However, room for improvement remains. Applicant has found that such objective can be achieved by applying in each of the two outer layers 100 wt % of mPE comprising a first mPE described herein, based on total weight of polymer in the outer layer. At a given density, thickness, and total mPE amount of the film, the multilayer film made therefrom, regardless of density difference between the core and the outer layers or composition of the core layer as previously indicated, can demonstrate remarkable advantages in optical properties over a multilayer film having about 50 wt % of mPE present in each outer layer, accompanied by mechanical properties at a comparable or even improved level. This allows the film manufacturer to enhance overall film performance achievable by adjusting mPE distribution between different layers without having to increase the total mPE amount of the film, thus providing a suitable alternative for coextruded film packaging applications highlighting cost-effectiveness.

SUMMARY OF THE INVENTION

Provided are multilayer films comprising polyethylene and methods for making such films.

In one embodiment, the present invention encompasses a multilayer film, comprising two outer layers and a core layer between the two outer layers, wherein each of the two outer layers comprises 100 wt % of metallocene polyethylene (mPE), based on total weight of polymer in the outer layer, wherein the mPE comprises a first mPE having a density of about 0.910 to about 0.945 g/cm$^3$, a melt index (MI), $I_{2.16}$, of about 0.1 to about 15 g/10 min, a molecular weight distribution (MWD) of about 1.5 to about 5.5, and a melt index ratio (MIR), $I_{21.6}/I_{2.16}$, of about 10 to about 100. Preferably, the mPE further comprises a second mPE. More preferably, the second mPE is different from the first mPE.

In another embodiment, the present invention relates to a method for making a multilayer film, comprising the steps of: (a) preparing two outer layers and a core layer between the two outer layers, wherein each of the two outer layers comprises 100 wt % of mPE, based on total weight of polymer in the outer layer, wherein the mPE comprises a first mPE having a density of about 0.910 to about 0.945 g/cm$^3$, an MI, $I_{2.16}$, of about 0.1 to about 15 g/10 min, an MWD of about 1.5 to about 5.5, and an MIR, $I_{21.6}/I_{2.16}$, of about 10 to about 100; and (b) forming a film comprising the layers in step (a).

The multilayer film described herein or made according to any method disclosed herein has at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film.

DETAILED DESCRIPTION OF THE PRESENT INVENTION

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.940 g/cm$^3$, typically from 0.915 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.97 or above, preferably 0.98 or above); and an ethylene polymer having a density of more than 0.940 g/cm$^3$ is referred to as a "high density polyethylene" (HDPE).

As used herein, "core" layer, "outer" layer, and "inner" layer are merely identifiers used for convenience, and shall not be construed as limitation on individual layers, their relative positions, or the laminated structure, unless otherwise specified herein.

As used herein, "first" mPE and "second" mPE are merely identifiers used for convenience, and shall not be construed as limitation on individual mPE, their relative order, or the number of mPEs used, unless otherwise specified herein.

As used herein, film layers that are the same in composition and in thickness are referred to as "identical" layers.

Polyethylene

In one aspect of the invention, the polyethylene that can be used for the multilayer film described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Polyethylenes that are useful in this invention include those sold by ExxonMobil Chemical Company in Houston Tex., including HDPE, LLDPE, and LDPE; and those sold under the ENABLE™, EXACT™, EXCEED™, ESCORENE™, EXXCO™, ESCOR™, PAXON™, and OPTEMA™ tradenames.

Preferred ethylene homopolymers and copolymers useful in this invention typically have one or more of the following properties:

1. an $M_w$ of 20,000 g/mol or more, 20,000 to 2,000,000 g/mol, preferably 30,000 to 1,000,000, preferably 40,000 to 200.000, preferably 50,000 to 750,000, as measured by size exclusion chromatography; and/or 2. a $T_m$ of 30° C. to 150° C., preferably 30° C. to 140° C., preferably 50° C. to 140° C., more preferably 60° C. to 135° C., as determined based on ASTM D3418-03; and/or 3. a crystallinity of 5% to 80%, preferably 10% to 70%, more preferably 20% to 60%, preferably at least 30%, or at least 40%, or at least 50%, as determined based on ASTM D3418-03; and/or 4. a heat of fusion of 300 J/g or less, preferably 1 to 260 J/g, preferably 5 to 240 J/g, preferably 10 to 200 J/g, as determined based on ASTM D3418-03; and/or 5. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 6. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 7. a Shore hardness (D scale) of 10 or more, preferably 20 or more, preferably 30 or more, preferably 40 or more, preferably 10) or less, preferably from 25 to 75 (as measured based on ASTM D 2240); and/or 8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethelene useful herein is produced by polymerization of ethylene and, optionally, an alpha-olefin with a catalyst having, as a transition metal component, a bis (n-$C_{3-4}$ alkyl cyclopentadienyl) hafnium compound, wherein the transition metal component preferably comprises from about 95 mol % to about 99 mol % of the hafnium compound as further described in U.S. Pat. No. 6,956,008.

In another embodiment of the invention, the polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt %, to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

In one embodiment, the multilayer film described herein comprises in each of the two outer layers 100 wt % of mPE, based on total weight of polymer in the outer layer, mPE homopolymers or copolymers that can be used with the present invention may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Houston, Tex. under the tradename EXCEED™ Polyethylene or ENABLE™ Polyethylene.

In a class of embodiments, the mPE in each outer layer of the multilayer film of the present invention comprises a first mPE, as a polyethylene defined herein, having a density of about 0.910 to about 0.945 g/cm³, an MI, $I_{2.16}$, of about 0.1 to about 15 g/10 min, an MWD of about 1.5 to about 5.5, and an MIR, $I_{21.6}/I_{2.16}$, of about 10 to about 100. In various embodiments, the first mPE may have one or more of the following properties:

(a) a density (sample prepared according to ASTM D-4703, and the measurement according to ASTM D-1505) of about 0.910 to 0.945 g/cm³, or about 0.912 to about 0.935 g/cm³;

(b) an MI ($I_{2.16}$, ASTM D-1238, 2.16 kg, 190° C.) of about 0.1 to about 15 g/10 min, or about 0.3 to about 10 g/10 min, or about 0.5 to about 5 g/10 min:

(c) an MIR ($I_{21.6}$ (190° C., 21.6 kg)/$I_{2.16}$ (190° C., 2.16 kg)) of about 10 to about 100, or about 15 to about 80, or about 16 to about 50;

(d) a Composition Distribution Breadth Index ("CDBI") of up to about 85%, or up to about 75%, or about 5 to about 85%, or 10 to 75%. The CDBI may be determined using techniques for isolating individual fractions of a sample of the resin. The preferred technique is Temperature Rising Elution Fraction ("TREF"), as described in Wild. et al., J. Poly. Sci., Poly. Phys. Ed., Vol. 20, p. 441 (1982), which is incorporated herein for purposes of U.S. practice:

(e) an MWD of about 1.5 to about 5.5; MWD is measured using a gel permeation chromatograph ("GPC") equipped with a differential refractive index ("DRI") detector; and/or (f) a branching index of about 0.9 to about 1.0, or about 0.96 to about 1.0, or about 0.97 to about 1.0. Branching Index is an indication of the amount of branching of the polymer and is defined as $g'=[Rg]^2_{br}/[Rg]^2_{lin}$. "Rg" stands for Radius of Gyration. and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

The first mPE is not limited by any particular method of preparation and may be formed using any process known in the art. For example, the first mPE may be formed using gas phase, solution, or slurry processes.

In one embodiment, the first mPE is formed in the presence of a metallocene catalyst. For example, the first mPE may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. mPEs useful as the first mPE include those commercially available from ExxonMobil Chemical Company in Houston, Tex. such as those sold under the trade designation ENABLE™ or EXCEED™.

In accordance with a preferred embodiment, the mPE in each outer layer of the multilayer film described herein further comprises a second mPE, as a polyethylene defined herein, having a density of about 0.910 to about 0.945 g/cm³, an MI, $I_{2.16}$, of about 0.1 to about 15 g/10 min, an MWD of about 1.5 to about 5.5, and an MIR, $I_{21.6}/I_{2.16}$, of about 10 to about 100. In various embodiments, the second mPE may have one or more of the properties or be prepared as defined above for the first mPE. The second mPE may be the same as or different from the first mPE. Preferably, the second mPE is different from the first mPE.

In another preferred embodiment, the multilayer film described herein comprises in the core layer at least one of LLDPE, LDPE and HDPE (as a polyethylene defined herein).

The LLDPEs that are useful in the core layer of the multilayer films described herein include linear low density polyethylenes having a comonomer content within the range from 0.5 to 20 wt %, the comonomer derived from $C_3$ to $C_{10}$ α-olefins, preferably 1-butene or 1-hexene. The density of desirable LLDPEs are within the range from 0.890 to 0.940 g/cm³, and within the range from 0.910 to 0.930 g/cm³ in another embodiment, and within the range from 0.912 and 0.925 g/cm³ in yet another embodiment. The MI of such LLDPEs is within the range from 0.1 or 0.2 or 0.4 to 4 or 6 or 10 dg/min. LLDPEs are distinct from LDPEs which are polymerized by free radical initiation and which contain a high amount of long chain branching resulting from back-biting reaction mechanisms that do not occur in catalytic polymerization as used for LLDPE which favors chain end incorporation of monomers. In one embodiment, the LLDPEs are made using a single site (often metallocene) catalyst, referred to herein as mLLDPE, in a gas phase or solution process. The use of a single site catalyst, even if supported on a catalyst support such silica, leads to improved homogeneity of the polymer. The CDBI determined according to the procedure disclosed herein may be in excess of 50%, preferably in excess of 60%. In another embodiment, the LLDPEs are made using multi-site titanium based Ziegler Natta catalysts, referred to herein as znLLDPE, in a gas phase or solution process. znLLDPE can be considered as having a broad compositional distribution with a CDBI of less than 50%. LLDPEs may have an MWD determined according to the procedure disclosed herein as of lower than 5. mLLDPEs preferably have an MWD of from 2 to 4, which is a further indication of their homogeneity. In the present invention, the core layer may contain more than one type of LLDPE.

The LDPEs that are useful in the core layer of the multilayer films described herein are ethylene based polymers produced by free radical initiation at high pressure in a tubular or autoclave reactor as well known in the art. The LDPEs have a medium to broad MWD determined according to the procedure disclosed herein of higher than 4, preferably from 5 to 40, and a high level of long chain branching as well as some short chain branching. The density is generally greater than 0.910 g/cm$^3$ and is preferably from 0.920 to 0.940 g/cm$^3$. The MI may be less than 0.55 or 0.45 g/10 min. In the present invention, the core layer may contain more than one type of LDPE.

The HDPEs that are useful in the core layer of the multilayer films described herein include linear low density polyethylenes having a comonomer content within the range from 0.01 to 5 wt %, the comonomer derived from $C_3$ to $C_{10}$ α-olefins, preferably 1-butene or 1-hexene, and is a homopolymer of ethylene in certain embodiments. The density of desirable HDPEs are within the range from 0.940 to 0.970 g/cm$^3$, and within the range from 0.945 to 0.965 g/cm$^3$ in another embodiment, and within the range from 0.950 and 0.965 g/cm$^3$ in yet another embodiment. The MI of such HDPEs is within the range from 0.1 or 0.2 or 0.4 to 4 or 6 or 10 dg/min. The HDPEs are typically prepared with either Ziegler-Natta or chromium-based catalysts in slurry reactors, gas phase reactors, or solution reactors. In the present invention, the core layer may contain more than one type of HDPE.

In particular, the first mPE present in each outer layer and the at least one of LLDPE. LDPE and HDPE present in the core layer of the multilayer film described herein may be optionally in a blend with one or more other polymers, such as polyethylenes defined herein, which blend is referred to as polyethylene composition. In particular, the polyethylene compositions described herein may be physical blends or in situ blends of more than one type of polyethylene or compositions of polyethylenes with polymers other than polyethylenes where the polyethylene component is the majority component, e.g., greater than 50 wt % of the total weight of the composition. Preferably, the polyethylene composition is a blend of two polyethylenes with different densities.

In one embodiment, each of the two outer layers of the multilayer film of the present invention comprises 100 wt % of mPE, based on total weight of polymer in the outer layer, wherein the mPE comprises the first mPE described herein. Preferably, the mPE further comprises the second mPE described herein. The second mPE may be the same as or different from the first mPE. In a preferred embodiment where the second mPE is different from the first mPE, the second mPE may be present in an amount of no more than about 50 wt %, no more than about 45 wt %, no more than about 40 wt %, no more than about 35 wt %, no more than about 30 wt %, no more than about 25 wt %, no more than about 20 wt %, no more than about 15 wt %, no more than about 10 wt %, or no more than about 5 wt %, based on the total weight of polymer in the outer layer.

In a preferred embodiment where the multilayer film described herein comprises in the core layer at least one of LLDPE, LDPE and HDPE described herein, the LLDPE, LDPE, HDPE or any combination thereof may be present in an amount of at least about 30 wt %, for example, anywhere between 30 wt %, 35 wt %, 40 wt %, 45 wt %, 50 wt %, 55 wt %, or 60 wt %, and 70 wt %, 75 wt %, 80 wt %, 85 wt %, 90 wt %, 95 wt %, or 100 wt %, based on the total weight of polymer in the core layer. Either of the outer layers may have a higher or lower density than that of the core layer. Preferably, at least one of the outer layers has a density lower than that of the core layer.

It has been surprisingly discovered that use of 100 wt %/b of mPE comprising the first mPE described herein in each outer layer (based on total weight of polymer in the outer layer) of a multilayer film may significantly aid in modifying the balance between optical and mechanical properties of the multilayer film. Especially, at a given overall film stiffness resulting from a predetermined overall film density, optical performance of the inventive film can be greatly strengthened by concentrating mPE in the outer layers without having to increase total mPE consumption, while other mechanical properties, including dart impact, puncture force, and tear strength, can remain at a comparable level or even grow in step with the optical properties, rather than being compromised as normally anticipated. In addition, no density difference between the core layer and the outer layers is required by the inventive film to achieve the above performance improvement, which may reverse the perception indicated by previous disclosure. As a result, the inventive film can provide a convenient and cost-effective alternative to current options for film packages where well balanced overall film performance is expected.

Film Structures

The multilayer film of the present invention may further comprise additional layer(s), which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and nonwovens (particularly polypropylene spunbond fibers or nonwovens), and substrates coated with inks, dyes, pigments, and the like.

In particular, a multilayer film can also include layers comprising materials such as ethylene vinyl alcohol (EVOH), polyamide (PA), polyvinylidene chloride (PVDC), or aluminium, so as to obtain barrier performance for the film where appropriate.

In one aspect of the invention, the multilayer film described herein may be produced in a stiff oriented form (often referred to as "pre-stretched" by persons skilled in the art) and may be useful for laminating to inelastic materials, such as polyethylene films, biaxially oriented polyester (e.g., polyethylene terephthalate (PET)) films, biaxially oriented polypropylene (BOPP) films, biaxially oriented polyamide (nylon) films, foil, paper, board, or fabric substrates, or may further comprise one of the above substrate films to form a laminate structure.

The thickness of the multilayer films may range from 5 to 200 µm in general and is mainly determined by the intended use and properties of the film. Stretch films may be thin; those for shrink films or heavy duty bags are much thicker. Conveniently the film has a thickness of from 5 to 200 µm, preferably from 10 to 150 µm, and more preferably from 20 to 120 µm. The thickness of each of the outer layers may be at least 5% of the total thickness, preferably from 10 to 40%. Preferably, the thickness ratio between one of the outer layers and the core layer is about 1:1 to about 1:6, for example, about 1:1, about 1:2, about 1:3, about 1:4, about 1:5, about 1:6, or in the range of any combinations of the values recited herein.

The multilayer film described herein may have an A/Y/A structure wherein A is an outer layer and Y is the core layer in contact with the outer layer. Suitably one or both outer layers are a skin layer forming one or both film surfaces and can serve as a lamination skin (the surface to be adhered to a substrate film) or a sealable skin (the surface to form a seal). The composition of the A layers may be the same or different, but conform to the limitations set out herein. Either of the A layers may have a higher or lower density than that of the Y layer. Preferably, at least one of the A layers has a density lower than that of the Y layer. Preferably, the A layers are identical. The film may have an A/B/X/B/A structure wherein A are outer layers and X represents the core layer and B are inner layers between the core layer and each outer layer. The composition of the B layers may also be the same or different, but conform to the limitations set out herein. The A and B layers may have the same composition or different compositions. Preferably, at least one of the B layers has a different composition than that of the A layer.

In a preferred embodiment, the multilayer film has a three-layer A/Y/A structure, comprising: (a) two outer layers, each comprising 100 wt % of an mPE, based on total weight of polymer in the outer layer, wherein the mPE has a density of about 0.910 to about 0.945 g/cm³, an MI, $I_{2.16}$, of about 0.1 to about 15 g/10 min, an MWD of about 1.5 to about 5.5, and an MIR, $I_{21.6}/I_{2.16}$, of about 10 to about 100; and (b) a core layer between the two outer layers, comprising at least one of LLDPE, LDPE and HDPE in an amount of at least about 30 wt %, based on total weight of polymer in the core layer.

The above multilayer film may have at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film. Preferably, the thickness ratio between each of the outer layers and the core layer is about 1:1 to 1:4.

Film Properties and Applications

The multilayer films of the present invention may be adapted to form flexible packaging films for a wide variety of applications, such as, cling film, low stretch film, non-stretch wrapping film, pallet shrink, over-wrap, agricultural, collation shrink film and laminated films, including stand-up pouches. The film structures that may be used for bags are prepared such as sacks, trash bags and liners, industrial liners, produce bags, and heavy duty bags. The bags may be made on vertical or horizontal form, fill and seal equipment. The film may be used in flexible packaging, food packaging, e.g., fresh cut produce packaging, frozen food packaging, bundling, packaging and unitizing a variety of products. A package comprising a multilayer film described herein can be heat sealed around package content. The film and package of the present invention can display outstanding optical properties as demonstrated by high clarity, low haze, and high gloss, and also comparable or even enhanced mechanical properties as demonstrated by dart impact, puncture force, and tear strength, due to concentration of predetermined mPE amount in the outer layers, which is especially appealing for film manufacturers expecting improved overall film performance at maintained manufacturing cost.

The inventive multilayer film may have at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film. Using the present invention, by modifying mPE distribution within the film layers, the long-standing difficulty in maximizing both optical and mechanical properties achievable of a multilayer film used for packaging applications without increasing mPE consumption can be addressed.

Methods for Making the Multilayer Film

Also provided are methods for making multilayer films of the present invention. A method for making a multilayer film may comprise the steps of: (a) preparing two outer layers and a core layer between the two outer layers, wherein each of the two outer layers comprises 100 wt % of mPE, based on total weight of polymer in the outer layer, wherein the mPE comprises a first mPE having a density of about 0.910 to about 0.945 g/cm³, an MI, $I_{2.16}$, of about 0.1 to about 15 g/10 min, an MWD of about 1.5 to about 5.5, and an MIR, $I_{21.6}/I_{2.16}$, of about 10 to about 100; and (b) forming a film comprising the layers in step (a); wherein the multilayer film has at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film.

The multilayer films described herein may be formed by any of the conventional techniques known in the art including blown extrusion, cast extrusion, coextrusion, blow molding, casting, and extrusion blow molding.

In one embodiment of the invention, the multilayer films of the present invention may be formed by using blown techniques, i.e., to form a blown film. For example, the composition described herein can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 50 mm extruder that is water-cooled, resistance heated, and has an L/D ratio of 30:1. The film can be produced using a 28 cm W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

The compositions prepared as described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 10 to 50 μm and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

A laminate structure with the inventive multilayer film prepared as described herein can be formed by lamination to a substrate film as previously described herein.

Other embodiments of the present invention can include:

1. A multilayer film, comprising two outer layers and a core layer between the two outer layers, wherein each of the two outer layers comprises 100 wt % of metallocene polyethylene (mPE), based on total weight of polymer in the outer layer, wherein the mPE comprises a first mPE having a density of about 0.910 to about 0.945 g/cm$^3$, a melt index (MI), $I_{2.16}$, of about 0.1 to about 15 g/10 min, a molecular weight distribution (MWD) of about 1.5 to about 5.5, and a melt index ratio (MIR), $I_{21.6}/I_{2.16}$, of about 10 to about 100;

wherein the multilayer film has at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film.

2. The multilayer film of paragraph 1, wherein the mPE further comprises a second mPE.

3. The multilayer film of paragraph 2, wherein the second mPE has a density of about 0.910 to about 0.945 g/cm$^3$, an MI, $I_{2.16}$, of about 0.1 to about 15 g/10 min, an MWD of about 1.5 to about 5.5, and an MIR, $I_{21.6}/I_{2.16}$, of about 10 to about 100.

4. The multilayer film of any of paragraphs 1 to 3, wherein the core layer comprises at least one of LLDPE, LDPE and HDPE.

5. The multilayer film of paragraph 4, wherein the at least one of LLDPE, LDPE and HDPE is present in an amount of at least about 30 wt %, based on total weight of polymer in the core layer.

6. The multilayer film of any of paragraphs 1 to 5, wherein at least one of the outer layers has a density lower than that of the core layer.

7. The multilayer film of any of paragraphs 1 to 6, wherein the thickness ratio between one of the outer layers and the core layer is about 1:1 to about 1:6.

8. The multilayer film of any of paragraphs 1 to 7, wherein the two outer layers are identical.

9. A multilayer film, comprising:
(a) two outer layers, each comprising 100 wt % of an mPE, based on total weight of polymer in the outer layer, wherein the mPE has a density of about 0.910 to about 0.945 g/cm$^3$, an MI, $I_{2.16}$, of about 0.1 to about 15 g/10 min, an MWD of about 1.5 to about 5.5, and an MIR, $I_{21.6}/I_{2.16}$, of about 10 to about 100; and
(b) a core layer between the two outer layers, comprising at least one of LLDPE, LDPE and HDPE in an amount of at least about 30 wt %, based on total weight of polymer in the core layer;

wherein the multilayer film has at least one of the following properties: (i) a haze of at least 40% lower, (ii) a clarity of at least 90% higher, (iii) a gloss of at least 40% higher, (iv) a dart impact of up to about 40%, higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film.

10. The multilayer film of paragraph 9, wherein the thickness ratio between each of the outer layers and the core layer is about 1:1 to 1:4.

11. A method for making a multilayer film, comprising the steps of:

(a) preparing two outer layers and a core layer between the two outer layers, wherein each of the two outer layers comprises 100 wt % of mPE, based on total weight of polymer in the outer layer, wherein the mPE comprises a first mPE having a density of about 0.910 to about 0.945 g/cm$^3$, an MI, $I_{2.16}$, of about 0.1 to about 15 g/10 min, an MWD of about 1.5 to about 5.5, and an MIR, $I_{21.6}/I_{2.16}$, of about 10 to about 100; and (b) forming a film comprising the layers in step (a);

wherein the multilayer film has at least one of the following properties: (i) a haze of at least 40% lower, (ii) a clarity of at least 90% higher, (iii) a gloss of at least 40%/higher, (iv) a dart impact of up to about 40% higher, (v) a puncture force of up to about 12% higher, and (vi) a tear strength of up to about 5% lower, compared to that of a multilayer film having about 50 wt % of mPE present in each of outer layers but otherwise identical in terms of density, thickness and total mPE amount of the film.

12. The method of paragraph 11, wherein the multilayer film in step (b) is formed by blown extrusion, cast extrusion, coextrusion, blow molding, casting, or extrusion blow molding.

EXAMPLES

The present invention, while not meant to be limited by, may be better understood by reference to the following examples and tables.

Example 1

Example 1 illustrates optical and mechanical performance demonstrated by two inventive samples (Samples 1 and 2) in comparison with four comparative samples (Samples 1' and 2') comprising 50 wt % mPE in each outer layer, based on total weight of polymer in the outer layer, but otherwise identical in terms of density, thickness and total mPE amount of the film. Polyethylene products used in the samples include: ENABLE™ 27-03HH mPE resin (density: 0.927 g/cm$^3$, MI: 0.3 g/10 min, MIR: 56) (ExxonMobil Chemical Company, Houston, Tex., USA), ENABLE™ 35-05HH mPE resin (density: 0.935 g/cm$^3$, MI: 0.5 g/10 min, MIR: 47) (ExxonMobil Chemical Company, Houston, Tex., USA), HDPE 6097 (density: 0.948 g/cm$^3$) (PetroChina Daqing Petrochemical Company), and LDPE 2420D (density: 0.922-0.923 g/cm$^3$, MI: ~0.3 g/10 min) (PetroChina Daqing Petrochemical Company (CNPC-DQ)). A 60 μm three-layer film of an A/Y/A structure with a layer thickness ratio of 1:2:1 was prepared for all samples on a coextrusion blown film line with a BUR of 3.0. Structure-wise formulations and density of the film samples are listed below in Table 1.

TABLE 1

Structure-wise formulations (wt %) and density (g/cm$^3$) of film samples in Example 1

| Sample No. | Density (g/cm$^3$) | Outer | Core |
|---|---|---|---|
| 1 | 0.930 | ENABLE ™ 27-03HH (100) | LDPE 2420D (CNPC-DQ) (60) HDPE 6097 (40) |
| 1' | 0.930 | ENABLE ™ 27-03HH (50) LDPE 2420D (CNPC-DQ) (30) HDPE 6097 (20) | ENABLE ™ 27-03HH (50) LDPE 2420D (CNPC-DQ) (30) HDPE 6097 (20) |
| 2 | 0.934 | ENABLE ™ 35-05HH (100) | LDPE 2420D (CNPC-DQ) (60) HDPE 6097 (40) |
| 2' | 0.934 | ENABLE ™ 35-05HH (50) LDPE 2420D (CNPC-DQ) (30) HDPE 6097 (20) | ENABLE ™ 35-05HH (50) LDPE 2420D (CNPC-DQ) (30) HDPE 6097 (20) |

Haze (wide-angle scattering) was measured based on ASTM D1003 using a haze meter Haze-Guard Plus AT-4725 from BYK Gardner and is defined as the percentage of transmitted light passing through the bulk of the film sample that is deflected by more than 2.5°. Total transmittance is a measurement of how much light passes through a film (ratio of total transmitted light to incident light). The haze is the ratio in % of the diffused light relative to the total light transmitted by the sample film.

Clarity was measured based on ASTM D1746 using Zebedee Clarity Meter CL-100 (Zebedee Corporation, Iowa. USA) and is defined as regular transmitted light that is deflected less than 0.1° from the axis of incident light through the bulk of the film sample.

Gloss was measured based on ASTM D-2457 using a gloss meter Micro Gloss 45 from BYK Gardner. A light source is beamed onto the plastic surface at an angle of 45° and the amount of light reflected is measured as a Gloss Unit (GU) value. The higher the gloss value is, the shinier the plastic is.

Dart impact was measured by a method following ASTM D1709 on a Dart Impact Tester Model C from Davenport Lloyd Instruments in which a pneumatically operated annular clamp is used to obtain a uniform flat specimen and the dart is automatically released by an electro-magnet as soon a sufficient air pressure is reached on the annular clamp. A dart with a 38.10±0.13 mm diameter hemispherical head dropped from a height of 0.66±0.01 m was employed. Dart impact measures the energy causing a film to fail under specified conditions of impact of a freely-falling dart. This energy is expressed in terms of the weight (mass, g) of the dart falling from a specified height, which would result in 50% failure of tested samples. Samples have a minimum width of 20 cm and a recommended length of 10 m. Samples are generally free of pinholes, wrinkles, folds or other apparent defects, unless such defects constitute variables by request.

Puncture resistance was measured based on ASTM D5748, which is designed to provide load versus deformation response under biaxial deformation conditions at a constant relatively low test speed (change from 250 mm/min to 5 mm/min after reach pre-load (0. IN)). Film samples were tested below the cross-head area with the 2.5 kN load cell. The sample was about 550 mm*900 mm in size. Maximum Puncture force is the maximum load achieved by the film sample before the break point, expressed in (N).

Elmendorf tear strength was measured in machine direction (MD) based on ASTM D1922-06a using the Tear Tester 83-11-01 from TMI Group of Companies and measures the energy required to continue a pre-cut tear in the test sample, expressed in (g/μm). Samples were cut across the web using the constant radius tear die and were free of any visible defects (e.g., die lines, gels, etc.).

Samples were conditioned at 23° C.±2° C. and 50%±10% relative humidity for at least 40 hours prior to determination of all properties. Test results are listed in Table 2.

TABLE 2

Optical and mechanical properties of film samples in Example 1

| Properties | Sample No. | | | |
|---|---|---|---|---|
| | 1 | 1' | 2 | 2' |
| Haze (%) | 13.8 | 24.1 | 14.4 | 28.1 |
| Clarity (%) | 23.7 | 8.3 | 14.0 | 7.3 |
| Gloss 45° (GU) | 45.4 | 31.1 | 48.6 | 26.4 |
| Dart Impact (g) | 225.9 | 162.9 | 131.4 | 117.9 |
| Puncture at Fmax (N) | 75.1 | 77.4 | 78.3 | 77.8 |
| Tear Strength (MD) (g/μm) | 1.36 | 1.24 | 0.96 | 1.01 |

As shown in Table 2, at a given density, thickness and total mPE amount of the film, the inventive samples remarkably outperformed the comparative samples in optical properties, in step with mechanical properties at a comparable or even improved level in terms of dart impact and puncture force, indicating a good balance achieved between the mechanical and optical properties.

Particularly, without being bound by theory, it is believed that concentrating mPE amount into outer layers of a multilayer film in a coextrusion process without changing the total mPE amount provided can desirably enhance optical performance of a film without impairing but even improving existing mechanical properties. As a result, the present invention has established an efficient and cost-effective way to prepare multilayer films of well-balanced overall performance.

Example 2

Example 2 demonstrates the role that 100 wt % presence of the mPE described herein in the outer layers plays in improvement on film performance, based on total weight of polymer in the outer layer, in relation to density difference between the core and the outer layers or composition of the core layer. A total of 15 inventive samples having a thickness of 60 μm (Samples A-D), 50 μm (Samples E-J), and 40 μm (Samples K-O), respectively, were provided. A three-layer film of an A/Y/A structure with a layer thickness ratio of 1:3:1 were prepared for all samples by using ENABLE™ 35-05HH mPE resin (density: 0.935 g/cm³, MI: 0.5 g/10 min, MIR: 47) (ExxonMobil Chemical Company, Houston, Tex., USA), ExxonMobil™ HDPE HTA 108 resin (density: 0.961 g/cm³) (ExxonMobil Chemical Company, Houston, Tex., USA), and LDPE 2420D (density: 0.9225 g/cm³, MI: 0.25 g/10 min) (CNOOC and Shell Petrochemicals Co., Ltd. (CNOOC-Shell)), on a coextrusion blown film line with a BUR of 3.0. Formulations of the core layers (all outer layers prepared by 100 wt % of ENABLE™ 35-05HH mPE resin, having a density of 0.9350 g/cm³) and thickness of the film samples are listed below in Table 3. Haze, clarity, and gloss were respectively measured by methods as previously described herein. Test results corresponding to samples with varying densities of core layers and the films are shown in Table 4.

TABLE 3

Formulations of the core layers (wt %) and thickness (μm) of film samples in Example 2

| Sample No. | Thickness (μm) | Core |
|---|---|---|
| A | 60 | ENABLE ™ 35-05HH (36.7) |
| | | LDPE 2420D (CNOOC-Shell) (30.0) |
| | | ExxonMobil ™ HDPE HTA 108 (33.3) |
| B | | ENABLE ™ 35-05HH (18.3) |
| | | LDPE 2420D (CNOOC-Shell) (40.0) |
| | | ExxonMobil ™ HDPE HTA 108 (41.7) |
| C | | ENABLE ™ 35-05HH (16.7) |
| | | LDPE 2420D (CNOOC-Shell) (50.0) |
| | | ExxonMobil ™ HDPE HTA 108 (33.3) |
| D | | LDPE 2420D (CNOOC-Shell) (50.0) |
| | | ExxonMobil ™ HDPE HTA 108 (50.0) |
| E | 50 | ENABLE ™ 35-05HH (28.3) |
| | | LDPE 2420D (CNOOC-Shell) (30.0) |
| | | ExxonMobil ™ HDPE HTA 108 (41.7) |
| F | | ENABLE ™ 35-05HH (20.0) |
| | | LDPE 2420D (CNOOC-Shell) (30.0) |
| | | ExxonMobil ™ HDPE HTA 108 (50.0) |
| G | | ENABLE ™ 35-05HH (26.7) |
| | | LDPE 2420D (CNOOC-Shell) (40.0) |
| | | ExxonMobil ™ HDPE HTA 108 (33.3) |
| H | | ENABLE ™ 35-05HH (18.3) |
| | | LDPE 2420D (CNOOC-Shell) (40.0) |
| | | ExxonMobil ™ HDPE HTA 108 (41.7) |
| I | | ENABLE ™ 35-05HH (10.0) |
| | | LDPE 2420D (CNOOC-Shell) (40.0) |
| | | ExxonMobil ™ HDPE HTA 108 (50.0) |
| J | | ENABLE ™ 35-05HH (8.3) |
| | | LDPE 2420D (CNOOC-Shell) (50.0) |
| | | ExxonMobil ™ HDPE HTA 108 (41.6) |
| K | 40 | ENABLE ™ 35-05HH (36.7) |
| | | LDPE 2420D (CNOOC-Shell) (30.0) |
| | | ExxonMobil ™ HDPE HTA 108 (33.3) |
| L | | ENABLE ™ 35-05HH (20.0) |
| | | LDPE 2420D (CNOOC-Shell) (30.0) |
| | | ExxonMobil ™ HDPE HTA 108 (50.0) |
| M | | ENABLE ™ 35-05HH (18.3) |
| | | LDPE 2420D (CNOOC-Shell) (40.0) |
| | | ExxonMobil ™ HDPE HTA 108 (41.7) |
| N | | ENABLE ™ 35-05HH (16.7) |
| | | LDPE 2420D (CNOOC-Shell) (50.0) |
| | | ExxonMobil ™ HDPE HTA 108 (33.3) |
| O | | LDPE 2420D (CNOOC-Shell) (50.0) |
| | | ExxonMobil ™ HDPE HTA 108 (50.0) |

TABLE 4

Optical properties of film samples in Example 2 with different densities of the core layers and the films

| Sample No. | Thickness (μm) | Outer Density (g/cm³) | Core Density (g/cm³) | Film Density (g/cm³) | Haze (%) | Clarity (%) | Gloss 45° (GU) |
|---|---|---|---|---|---|---|---|
| A | 60 | 0.9350 | 0.9401 | 0.9380 | 16.2 | 63.0 | 52.7 |
| B | | | 0.9410 | 0.9386 | 15.5 | 64.7 | 52.3 |
| C | | | 0.9377 | 0.9366 | 15.4 | 63.0 | 53.4 |
| D | | | 0.9420 | 0.9392 | 16.6 | 62.3 | 52.4 |
| E | 50 | | 0.9422 | 0.9393 | 14.9 | 65.0 | 51.0 |
| F | | | 0.9444 | 0.9406 | 15.9 | 64.3 | 51.7 |
| G | | | 0.9389 | 0.9373 | 13.8 | 64.0 | 51.3 |
| H | | | 0.9410 | 0.9386 | 14.3 | 63.0 | 51.8 |
| I | | | 0.9432 | 0.9399 | 14.9 | 61.3 | 52.3 |
| J | | | 0.9389 | 0.9373 | 14.2 | 65.7 | 52.2 |
| K | 40 | | 0.9401 | 0.9380 | 13.5 | 67.3 | 48.7 |
| L | | | 0.9444 | 0.9406 | 14.5 | 63.0 | 48.4 |
| M | | | 0.9410 | 0.9386 | 13.7 | 64.3 | 49.9 |
| N | | | 0.9377 | 0.9366 | 12.9 | 65.3 | 50.8 |
| O | | | 0.9420 | 0.9392 | 13.2 | 64.7 | 50.3 |

It can been seen from Table 4 that optical properties of all the inventive samples having the same thickness were improved to a very similar level as long as 100 wt % (based on total weight of polymer in the outer layer) of the mPE described herein were used in the outer layers having a density lower than that of the core layer, however much lower the density of the outer layers is than that of the core layer or whatever composition of the core layer is.

Example 3

Example 3 further illustrates that 100 wt % presence of the mPE described herein in the outer layers contributes to improved film performance, based on total weight of polymer in the outer layer, independently of density difference between the core and the outer layers or composition of the core layer. A three-layer film of an A/Y/A structure with a thickness of 60 μm were prepared for all three samples by using ENABLE™ 35-05HH mPE resin (density: 0.935 g/cm$^3$, MI: 0.5 g/10 min, MIR: 47) (ExxonMobil Chemical Company, Houston, Tex., USA), ExxonMobil™ HDPE HTA 002 resin (density: 0.952 g/cm$^3$) (ExxonMobil Chemical Company, Houston, Tex., USA), and LDPE 2420D (density: 0.9225 g/cm$^3$, MI: 0.25 g/10 min) (CNOOC-Shell), on a coextrusion blown film line with a BUR of 3.0. Samples 3 and 4 were provided as inventive samples having a thickness ratio of 1:3:1 and 1:2:1, respectively. Sample 3' was provided as comparative sample having a thickness ratio of 1:3:1 and comprising 50 wt % mPE in each outer layer, based on total weight of polymer in the outer layer, but otherwise identical in terms of density, thickness and total mPE amount of the film. Structure-wise formulations of the film samples are listed below in Table 5. Optical properties were respectively measured by methods as previously described herein. Test results corresponding to samples with different layer and film densities are shown in Table 6.

TABLE 5

Structure-wise formulations (wt %) of film samples in Example 3

| Sample No. | Outer | Core |
| --- | --- | --- |
| 3 | ENABLE ™ 35-05HH (100) | ENABLE ™ 35-05HH (16.7) LDPE 2420D (CNOOC-Shell) (50.0) ExxonMobil ™ HDPE HTA 002 (33.3) |
| 4 | ENABLE ™ 35-05HH (100) | LDPE 2420D (CNOOC-Shell) (60.0) ExxonMobil ™ HDPE HTA 002 (40.0) |
| 3' | ENABLE ™ 35-05HH (50.0) LDPE 2420D (CNOOC-Shell) (30.0) ExxonMobil ™ HDPE HTA 002 (20.0) | ENABLE ™ 35-05HH (50.0) LDPE 2420D (CNOOC-Shell) (30.0) ExxonMobil ™ HDPE HTA 002 (20.0) |

TABLE 6

Optical and mechanical properties of film samples in Example 3 with different layer and film densities

| | Sample No. | | |
| --- | --- | --- | --- |
| | 3 | 4 | 3' |
| Outer Density (g/cm$^3$) | 0.9350 | 0.9350 | 0.9348 |
| Core Density (g/cm$^3$) | 0.9347 | 0.9346 | 0.9348 |

TABLE 6-continued

Optical and mechanical properties of film samples in Example 3 with different layer and film densities

| | Sample No. | | |
| --- | --- | --- | --- |
| | 3 | 4 | 3' |
| Film Density (g/cm$^3$) | 0.9348 | 0.9348 | 0.9348 |
| Haze (%) | 15.3 | 14.4 | 27.4 |
| Clarity (%) | 35.0 | 28.0 | 13.3 |
| Gloss 45° (GU) | 49.0 | 50.6 | 27.8 |

Results in Table 6 indicate that introduction of 100 wt % (based on total weight of polymer in the outer layer) of the mPE described herein into the outer layers can nonetheless lead to similar improvement in optical properties of the inventive samples having the same thickness, despite a density of the outer layers higher than that of the core layer.

Therefore, based on the above data in Examples 2 and 3, without being bound by theory, it can be concluded that strengthened performance of the inventive film is basically determined by introduction of 100 wt % of the mPE described herein into the outer layers, based on total weight of polymer in the outer layer, regardless of any density difference between the core and the outer layers or composition of the core layer, which reverses the common belief indicated by previous disclosure.

All documents described herein are incorporated by reference herein, including any priority documents and/or testing procedures. When numerical lower limits and numerical upper limits are listed herein ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A multilayer film, comprising two outer layers and a core layer between the two outer layers, wherein each of the two outer layers comprises 100 wt % of a metallocene polyethylene (mPE), based on total weight of polymer in the outer layer, wherein the mPE comprises a first mPE having a density of about 0.910 g/cm$^3$ to about 0.945 g/cm$^3$, a melt index (MI), $I_{2.16}$, of about 0.1 g/10 min to about 15 g/10 min, a molecular weight distribution (MWD) of about 1.5 to about 5.5, and a melt index ratio (MIR), $I_{21.6}/I_{2.16}$, of about 47 to about 100 and the core layer comprises a LLDPE having a MWD of less than 5, a LDPE having a MWD of greater than 4, or a HDPE having a MWD of less than 40, wherein the mPE in each of the two outer layers consists essentially of mPE having a MIR of about 47 to about 100; wherein the multilayer film has at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of the mPE present in each of outer layers but otherwise identical in terms of density, thickness, and total mPE amount of the film.

2. The multilayer film of claim 1, wherein the melt index ratio (MIR), $I_{21.6}/I_{2.16}$, of the first mPE is about 56 to about 100.

3. The multilayer film of claim 1, wherein the melt index ratio (MIR), $I_{21.6}/I_{2.16}$, of the first mPE is about 56 to about 100, and wherein the mPE in each of the two outer layers consists essentially of mPE having a MIR of about 56 to about 100.

4. The multilayer film of claim 1, wherein the mPE further comprises a second mPE.

5. The multilayer film of claim 4, wherein the second mPE has a density of about 0.910 g/cm$^3$ to about 0.945 g/cm$^3$, a MI, $I_{2.16}$, of about 0.1 g/10 min to about 15 g/10 min, a MWD of about 1.5 to about 5.5, and a MIR, $I_{21.6}/I_{2.16}$, of about 47 to about 100.

6. The multilayer film of claim 1, wherein the at least one of the LLDPE, the LDPE, or the HDPE is present in an amount of at least 30 wt %, based on a total weight of polymer in the core layer.

7. The multilayer film of claim 1, wherein the LDPE is present in an amount of at least 30 wt % and the HDPE is present in an amount of at least 33.3 wt %, wherein both weight percent values are based on a total weight of polymer in the core layer.

8. The multilayer film of claim 1, wherein the core layer comprises the HDPE and at least one of the LLDPE and the LDPE, and wherein the HDPE is present in an amount of about 30 wt % to about 50 wt %, based on a total weight of polymer in the core layer.

9. The multilayer film of claim 1, wherein the core layer comprises the LDPE and the HDPE, and wherein the HDPE is present in an amount of about 30 wt % to about 50 wt %, based on a total weight of polymer in the core layer.

10. The multilayer film of claim 1, wherein the core layer comprises the LLDPE, the LDPE, and the HDPE, and wherein the HDPE is present in an amount of about 30 wt % to about 50 wt %, based on a total weight of polymer in the core layer.

11. The multilayer film of claim 1, wherein the multilayer film is a three layer film.

12. The multilayer film of claim 1, wherein the two outer layers are identical.

13. The multilayer film of claim 1, wherein at least one of the outer layers has a density that is less than a density of the core layer.

14. The multilayer film of claim 1, wherein a thickness ratio between one of the outer layers and the core layer is about 1:1 to about 1:6.

15. The multilayer film of claim 6, wherein a thickness ratio between each of the outer layers and the core layer is about 1:1 to 1:4.

16. A method for making a multilayer film, comprising the steps of:
    (a) preparing two outer layers and a core layer between the two outer layers, wherein each of the two outer layers comprises 100 wt % of a metallocene polyethylene (mPE), based on a total weight of polymer in the outer layer, wherein the mPE comprises a first mPE having a density of about 0.910 g/cm$^3$ to about 0.945 g/cm$^3$, a melt index (MI), $I_{2.16}$, of about 0.1 g/10 min to about 15 g/10 min, a molecular weight distribution (MWD) of about 1.5 to about 5.5, and a melt index ratio (MIR), $I_{21.6}/I_{2.16}$, of about 47 to about 100 and the core layer comprises a LLDPE having a MWD of less than 5, a LDPE having a MWD of greater than 4, or a HDPE having a MWD of less than 40, wherein the mPE in each of the two outer layers consists essentially of mPE having a MIR of about 47 to about 100; and
    (b) forming a film comprising the layers in step (a);
    wherein the multilayer film has at least one of the following properties: (i) a haze of at least 40% lower, (ii) a clarity of at least 90% higher, (iii) a gloss of at least 40% higher, (iv) a dart impact of up to about 40% higher, (v) a puncture force of up to about 12% higher, and (vi) a tear strength of up to about 5% lower, compared to that of a multilayer film having about 50 wt % of the mPE present in each of outer layers but otherwise identical in terms of density, thickness, and total mPE amount of the film.

17. The method of claim 16, wherein the multilayer film in step (b) is formed by blown extrusion, cast extrusion, coextrusion, blow molding, casting, or extrusion blow molding.

18. The method of claim 16, wherein the HDPE is present in an amount of at least 33.3 wt %, based on a total weight of polymer in the core layer.

19. The method of claim 16, wherein the LDPE is present in an amount of at least 30 wt % and the HDPE is present in an amount of at least 33.3 wt %, wherein both weight percent values are based on a total weight of polymer in the core layer.

20. The method of claim 16, wherein the core layer comprises the HDPE and at least one of the LLDPE and the LDPE, and wherein the HDPE is present in an amount of about 30 wt % to about 50 wt %, based on a total weight of polymer in the core layer.

\* \* \* \* \*